Patented Sept. 10, 1935

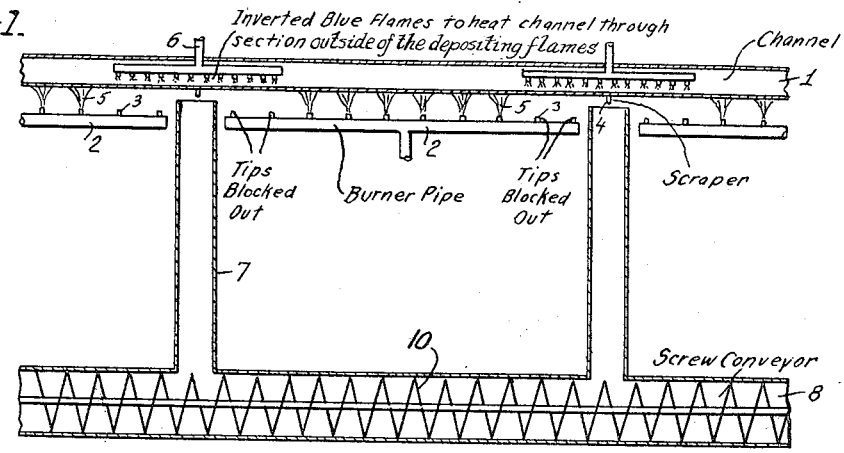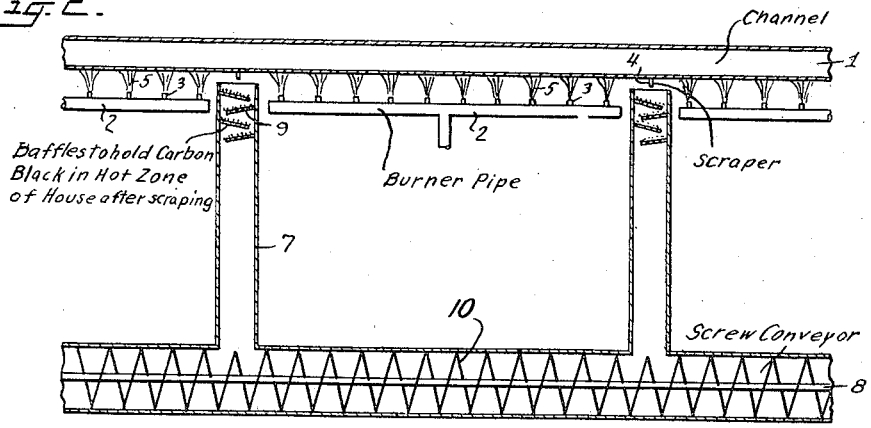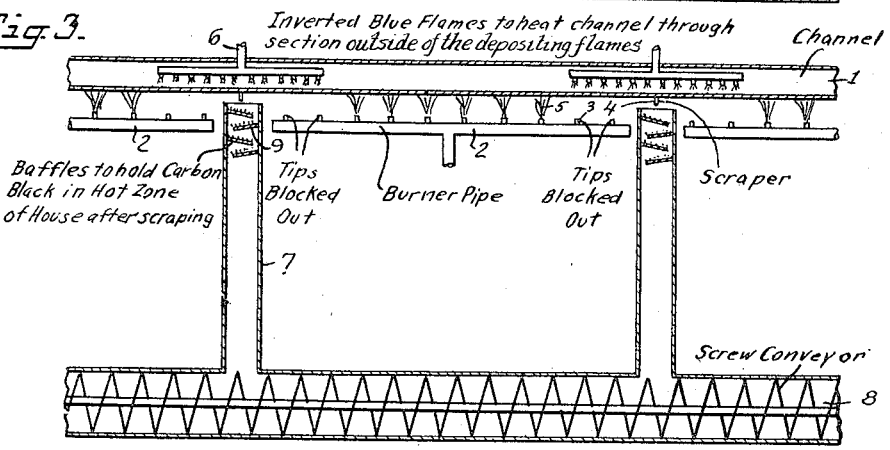

2,013,774

UNITED STATES PATENT OFFICE 2,013,774

PROCESS FOR THE MANUFACTURE OF CARBON BLACK

William Bryan Wiegand, Sound Beach, Conn.

Application August 24, 1932, Serial No. 630,216

5 Claims. (Cl. 134—60)

My invention relates to an improved process for the manufacture of carbon black of improved color and workability. Broadly, my invention comprises an improved process for the manufacture of carbon black in which, as a step of the manufacturing process, the carbon black is subjected to controlled oxidation under appropriate oxidizing conditions, at a suitable temperature and for a sufficient length of time, to produce an improved oxygenated carbon black product.

I use the term "carbon black" herein to define the product produced by impingement of a hydrocarbon gas flame, burning with the supply oxygen limited to permit only partial combustion, upon a cooler surface. I intend, particularly, to distinguish carbon black from lamp black, the latter product being formed as free soot and collected as such.

In the conventional process of manufacture of carbon black, a hydrocarbon gas flowing from any of various types of tips is burned, with the supply of oxygen limited to permit only partial combustion, in corresponding types of flames which are usually identified as round, bat-wing, or fish-tail. Restriction and regulation of the supply of air, to control the extent of combustion of the hydrocarbon gas, is commonly designated "drafting". The flames are caused to impinge upon a relatively cool metallic surface on which the carbon black formed in the process is deposited. The deposited carbon black is removed by scrapers, allowed to fall through hoppers to conveyors, usually of the screw type, and through the conveyors is discharged to bolting and packing operations. The combustion operation is carried out in so-called "burner-houses" from which the carbon black is removed by means of these conveyors.

Carbon black is used commercially for a wide variety of purposes, and the varying requirements of different purposes have led to the development of two different types of carbon black products. For use in rubber compounding, the ability of the product to strengthen or reinforce the rubber compound is an important quality. Also, for this use, the influence of the product upon the rate of vulcanization of the rubber compound is an important quality. For use in rubber compounding, either of these qualities, for example, is more important than the color or workability of the product. However, for use in paint, lacquer, varnish, ink and the like, color and workability are the qualities of primary importance. My invention relates particularly to a process for the manufacture of carbon black of special value in applications in which color and workability are of primary importance.

I use the term "color" herein to refer to the intensity of the black effect, or blackness, presented to the human eye by paints, lacquers, varnishes, inks and similar mixtures including the carbon black in question. In general I might say that better "color", as I am using the term herein, means less reflected light from a surface embodying the carbon black in question. I use the term "workability" herein to refer to ease of mixture of the product with, or dispersion of the product in, paint, lacquer and varnish vehicles and other liquid media, stability of such mixtures and dispersions, and, in the case of inks, the quality commonly referred to as "length". In the case of paint, improved workability signifies, for example, easier and more rapid grinding of the product in the vehicle, and, in the case of lacquer, improved workability signifies ease and rapidity of dispersion of the product in the lacquer vehicle. I have just defined the terms "color" and "workability" in the interest of accuracy. The meanings with which I am using these terms, however, are those meanings with which the terms are commonly used in the paint, lacquer, varnish and ink industries.

In the conventional process of manufacture of carbon black, color and workability can be controlled, within limits, by adjustments of the shape and size of the flames, of the degree of drafting and also, to some extent, by the relative position, speed of motion, etc., of the collecting surface. For example, color can be improved by the use of a tip with a smaller orifice in conjunction with an increase in drafting. Or similarly, tips producing a fish-tail flame may be substituted for slotted tips. The expedients for improving color hitherto available, however, have suffered from their inability to improve color without diminishing workability and without markedly diminishing the net yield of carbon black recovered from the hydrocarbon gas. Similarly with respect to workability, the expedients hitherto available have suffered from their inability to improve workability without impairing the color and without diminishing the yield.

According to my invention, I incorporate a new step in the manufacturing process which makes it possible simultaneously to improve color and workability and to control these qualities independently, within wide limits, and to accomplish these results with a minimum sacrifice of yield of the carbon black product. The new step consists essentially of controlled oxygenation of the carbon black, that is, heating the carbon black in an oxidizing atmosphere at a temperature upwards of 300° C. Temperatures in the range 300°–1,000° C. are useful in carrying out my invention and temperatures approximating 400° C. are particularly advantageous in carrying out my invention. This controlled oxidation is, with advantage, carried out in an atmosphere having an oxidation capacity less than air. This step may be carried out in various ways and it may be embodied in the complete manufacturing process in various ways.

I will further illustrate my invention with reference to the accompanying drawing which represents, diagrammatically and conventionally, some forms of apparatus adapted for the practice of my invention. My invention can be practiced in other forms of apparatus, and it will be understood that this further description, and the references to the particular forms of apparatus illustrated, are intended merely as illustrative of the invention.

In the accompanying drawing:

Fig. 1 is a fragmentary elevation of one form of apparatus;

Fig. 2 is another elevation of another form of apparatus; and

Fig. 3 is a fragmentary elevation of still another form of apparatus.

Referring more specifically to the accompanying drawing, I designates a channel, or cooling surface, upon which is deposited the carbon black produced by the incomplete combustion of hydrocarbon gases emitted through burner pipe 2. Burner tips 3 may be of any desired type, such as round, bat-wing or fish-tail, for example. Scraper blades 4 are provided for causing the carbon black to fall in hoppers 7 from which the carbon black is transferred by screw conveyor 10 through conveyor conduit 8 to bolters and packers (not shown). As shown in Figures 1 and 3, burner tips 3 are not provided adjacent the scraper blades 4 and thus the flames 5 do not impinge on the channel 1 at a point immediately adjacent the scraper blades 4. To heat the channel section not exposed to the flames 5, a burner 6 is provided and is so adjusted as to burn with inverted blue flame without deposition of carbon on the channel 1. In the modification shown in Fig. 2, baffles 9 are interposed in the hoppers 7 to retard the passage of the carbon black through the hoppers.

My improved process may be carried out in various ways in the apparatus illustrated as will be evident from the following description. As practiced with reference to the apparatus shown in Fig. 1, a hydrocarbon gas is admitted to the burner pipe 2 and burned with only partial combustion. Black formed by the incomplete combustion of the gas is deposited on the channel 1 the temperature of which is always above 300° C., and is removed therefrom in the usual manner by scraper 4 and caused to fall into the hopper 7 from which it travels to conveyer conduit 8. Before being removed from the channel 1, it will be noted that the black is allowed to remain in free contact with the atmosphere in the burner house, which normally contains about 14% oxygen, during which exposure the carbon black is maintained at a temperature above 300° C. by means of a burner such as illustrated at 6. In the ordinary operation, the flames are in such close proximity to the channel that the carbon black adhering thereto is more or less completely blanketed or sheltered from the burner house atmosphere by the flame atmosphere right up to the point at which it is scraped from the channel; then after being scraped from the channel it drops quickly through the hopper into a conveyer conduit maintained at relatively low temperature. This condition is modified in my improved method of manufacture by the elimination of one or more flames contiguous to the scraper as shown in Figs. 1 and 3. By eliminating this blanketing or sheltering effect at this point, an improvement in color and simultaneously in workability of the carbon black is obtained.

For example, in a conventional channel operation, the burner tips being four inches apart, two burner tips were removed on each side of the edge of the scrapers. No other change was made. A marked improvement of workability without impairment of color was thus accomplished. The improvement of workability is exemplified by the two following tests: (1) 100 grams of the black produced prior to this modification and 100 grams of the black produced subsequent to this modification were separately mixed with pale linseed oil to produce a mixture of predetermined viscosity. 1,680 cubic centimeters of oil were required, with the conventional black, to produce a mixture of the same viscosity as was produced, with the modified black, with 1,560 cubic centimeters of oil. (2) 9 ounces of each black were separately ground with a gallon of refined linseed oil in a small pebble mill, until a smooth homogeneous dispersion resulted. 40 hours of grinding were required to produce with the conventional black, a dispersion comparable to that produced, with the modified black, in 17 hours.

The temperature to which the carbon black is exposed after leaving the last flame, but before being scraped off, may be readily adjusted by applying heat to the top of the collecting surface or channel 1 by means of the burner 6, for example. The time and temperature to which the carbon black is exposed to the oxygen-containing atmosphere may vary considerably. As stated above, the collecting surface should always be maintained at a temperature above 300° C. but this temperature should not exceed 1,000° C. as too great a combustion loss will occur. In many cases a temperature of about 400° C. has been found particularly advantageous. Where the speed of motion of the channel is fixed, the desired improvement in the carbon black may be obtained within the time limit set by the speed of motion of the channel by proper adjustment of the heat supplied to the top of the collecting surface. Conversely, at fixed temperature the time of exposure of the carbon black to the oxygen-containing atmosphere may be lengthened or shortened by regulation of the channel speed.

In the apparatus illustrated in Fig. 2 the burner tips adjacent the scrapers are not removed nevertheless the same results are obtained and by the same general principle. In carrying out my improved process in this form of apparatus, baffles 9 are interposed between the depositing surface and the collecting hoppers, and the black is thereby held for a sufficient length of time to obtain the desired results in a heated zone and exposed to an oxygen-containing atmosphere. The time of exposure is readily controlled by the angle of the inclined planes and by their number. The temperature can be regulated, for example, by fixing the proximity of these baffles to the channel surface. In this form of my improved process, the carbon black during its descent through the hopper into the conveyer is free to be contacted with by the oxygen-containing atmosphere in the burning house and its descent is retarded long enough to obtain the desired improvement in color and workability.

In another variant of my improved process, I extend the conveyor conduit back through the burning house in a zone where the temperature is in excess of 300° C., and also at an appropriate point remove the top of this conveyor conduit, or by other means provide for free access of air, and thus obtain the improvements in respect of color and workability. When necessary, auxiliary burners may be used so as to insure that the conveyer reaches the required temperature.

In some cases, it is useful to carry out the last described variant of my process entirely outside of the burning house. To off-set the disadvantage of having to use a larger amount of gas for keeping up the temperature of the conveyer, there is the advantage of being able to handle the output of a large number of burning houses at one time through combining their production into one conveyer. Whether the treatment of the black is carried out within the burning house or outside will, of course, depend upon the relative costs of the two operations in particular cases.

The operation of my improved process in the apparatus shown in Fig. 3 will be apparent from the foregoing. In the apparatus illustrated, carbon black may be deposited in the channel I and exposed to an oxygen-containing atmosphere before scraping and this treatment may be continued after scraping by means of the baffles 9 located in hoppers 7, or the baffles 9 may be removed and the carbon black subjected to the oxygen-containing atmosphere only before scraping. Whether the carbon black is subjected to the oxygen-containing atmosphere before or after scraping, or both, it is to be clearly understood that the burner 6 may be used in all cases. It is also to be understood that no special form of burner tip or shape of flame is required in my improved process. A round, bat-wing, fish-tail or any other type burner tip may be used.

From an economic point of view, my improved process marks a distinct advance in that the yield of carbon black may be kept at a relatively high value through the use of existing burner tips, channel settings, etc., and yet an improved black of higher color or of improved workability, or both be obtained; a result which, if sought to be obtained by hitherto available means, would be accompanied by marked decrease in output or yield of carbon black per thousand feet of gas. I have found that by regulation of the temperature of the channel and of the widths of gap between the flames and the collecting scrapers, I can produce a carbon black of better color with unimpaired workability, or a carbon black of unimpaired color but with strikingly improved workability, or a carbon black of better color and with improved workability. In any case, however, the process is marked by the definite step of exposing the black immediately after deposition to the action of an oxidizing atmosphere, advantageously of oxidation capacity less than air, at temperatures at or greater than 300° C.

I claim:

1. In the manufacture of carbon black, the improvement which comprises burning a hydrocarbon gas with a supply of oxygen restricted to effect only partial combustion, causing the resulting flame to impinge upon a cooler collecting surface, and thereafter subjecting the carbon black deposited upon this cooling surface to controlled oxidation by exposing it to an oxidizing atmosphere at a temperature between 300° C. and 1000° C. to produce a carbon black of increased blackness and improved workability.

2. In the manufacture of carbon black, the improvement which comprises burning a hydrocarbon gas with a supply of oxygen restricted to effect only partial combustion, causing the resulting flame to impinge upon a cooler collecting surface, and thereafter subjecting the carbon black deposited upon this cooling surface to controlled oxidation by exposing it to an oxidizing atmosphere at a temperature of about 400° C. to produce a carbon black of increased blackness and improved workability.

3. In the manufacture of carbon black, the improvement which comprises burning a hydrocarbon gas with a supply of oxygen restricted to effect only partial combustion, causing the resulting flame to impinge upon a cooler collecting surface, and thereafter subjecting the carbon black deposited upon this cooling surface to controlled oxidation by exposing it to an oxidizing atmosphere having an oxidizing capacity less than air at a temperature between 300° C. and 1000° C. to produce a carbon black of increased blackness and improved workability.

4. In the manufacture of carbon black, the improvement which comprises burning a hydrocarbon gas with a supply of oxygen restricted to effect only partial combustion, causing the resulting flame to impinge upon a cooler collecting surface, and thereafter subjecting the carbon black deposited upon this collecting surface prior to removal therefrom to controlled oxidation by exposing it to an oxidizing atmosphere at a temperature between 300° C. and 1000° C. to produce a carbon black of increased blackness and improved workability.

5. In the manufacture of carbon black, the improvement which comprises burning a hydrocarbon gas with a supply of oxygen restricted to effect only partial combustion, causing the resulting flame to impinge upon a cooler collecting surface, and immediately thereafter subjecting the carbon black deposited upon this cooling surface to controlled oxidation by exposing it to an oxidizing atmosphere at a temperature between 300° C. and 1000° C. to produce a carbon black of increased blackness and improved workability.

WILLIAM BRYAN WIEGAND.